March 13, 1956    C. A. PARKER    2,738,129
CALCULATING MECHANISM
Original Filed Sept. 29, 1949    6 Sheets-Sheet 1

INVENTOR.
Charles A. Parker
BY
Dawson & Ooms
ATTORNEYS

March 13, 1956 — C. A. PARKER — 2,738,129
CALCULATING MECHANISM
Original Filed Sept. 29, 1949 — 6 Sheets-Sheet 2

INVENTOR.
Charles A. Parker
BY
Dawson & Ooms
ATTORNEYS

March 13, 1956
C. A. PARKER
2,738,129
CALCULATING MECHANISM
Original Filed Sept. 29, 1949
6 Sheets-Sheet 3
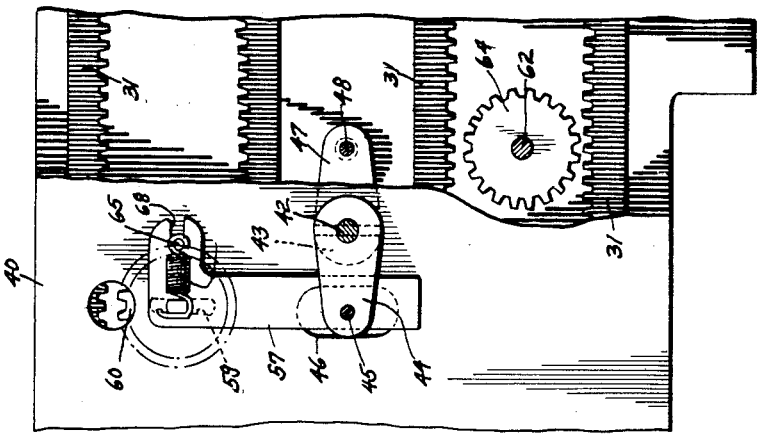
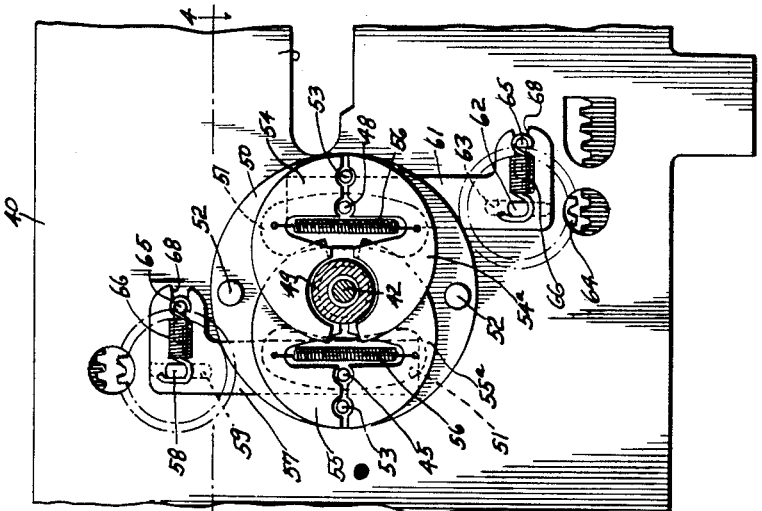
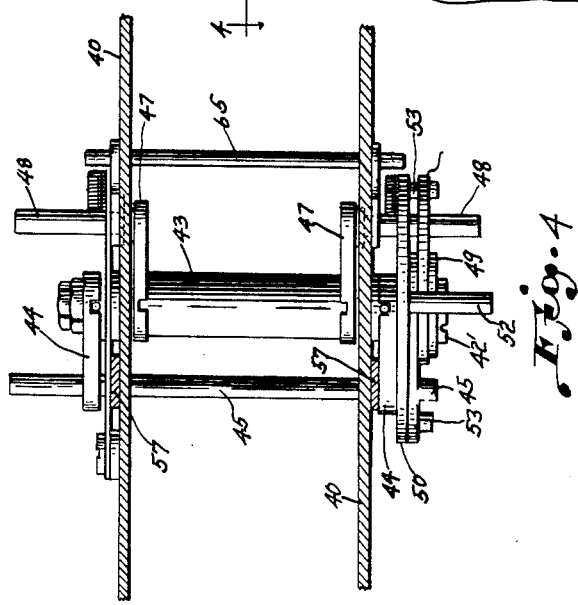
INVENTOR.
Charles A. Parker
BY
Dawson & Ooms
ATTORNEYS March 13, 1956  C. A. PARKER  2,738,129
CALCULATING MECHANISM
Original Filed Sept. 29, 1949  6 Sheets-Sheet 4

Charles A. Parker
INVENTOR.

Lawson & Ooms
ATTORNEYS

March 13, 1956 C. A. PARKER 2,738,129
CALCULATING MECHANISM
Original Filed Sept. 29, 1949 6 Sheets-Sheet 5
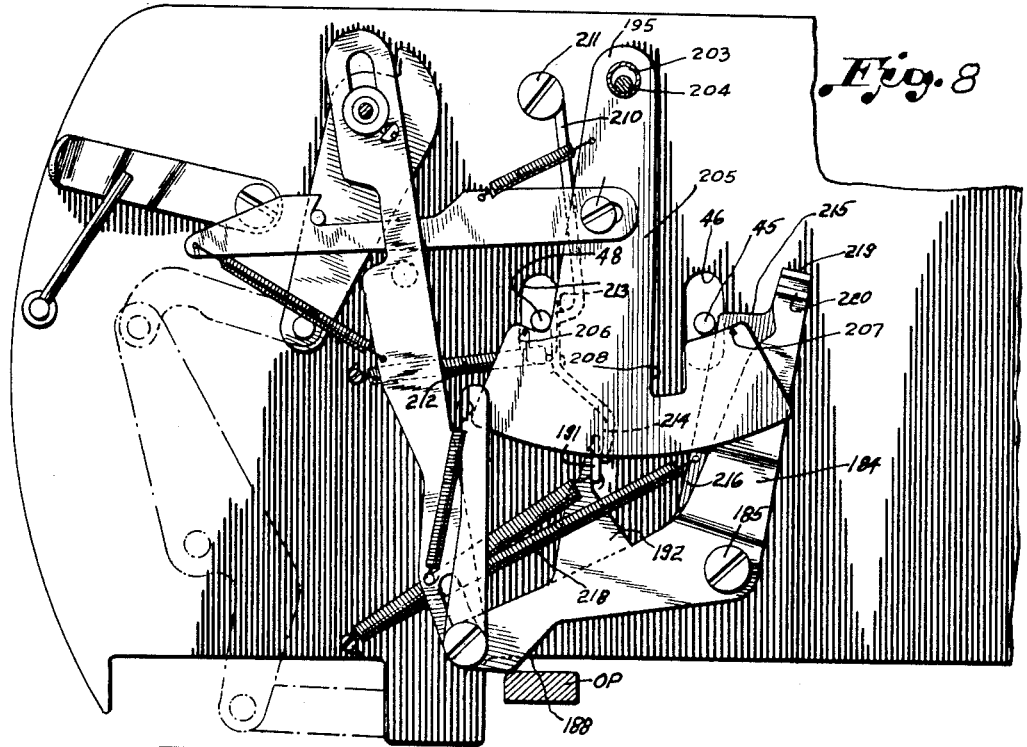
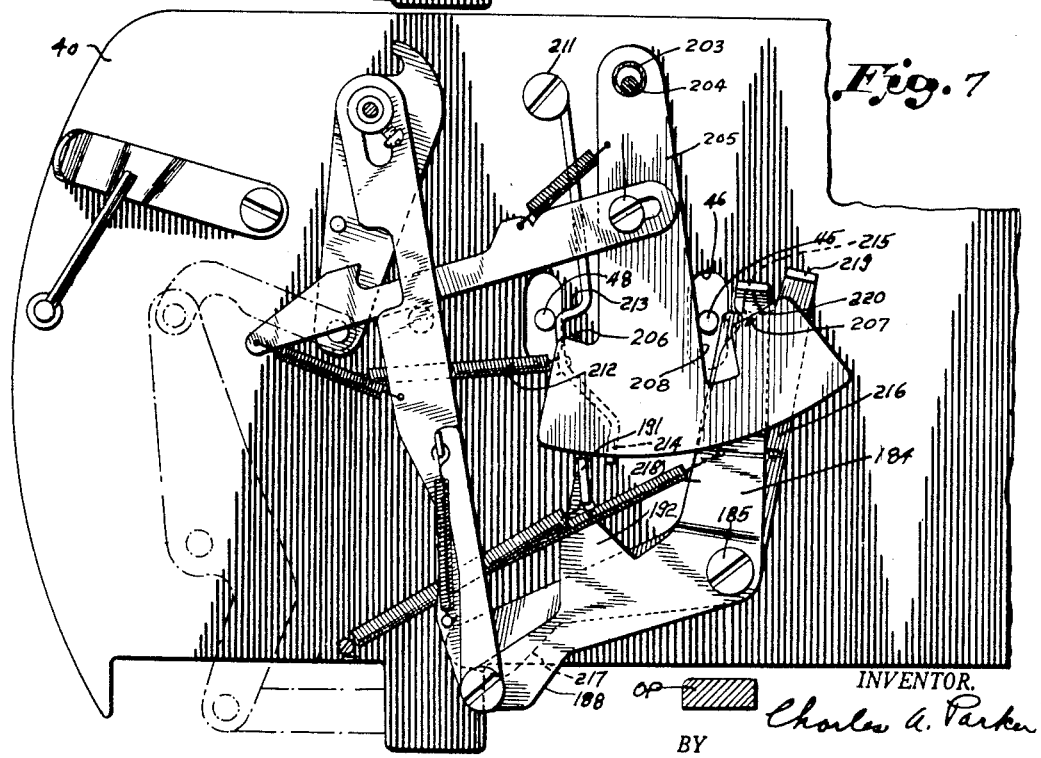
INVENTOR.
Charles A. Parker
BY
Lawson & Jones
ATTORNEYS

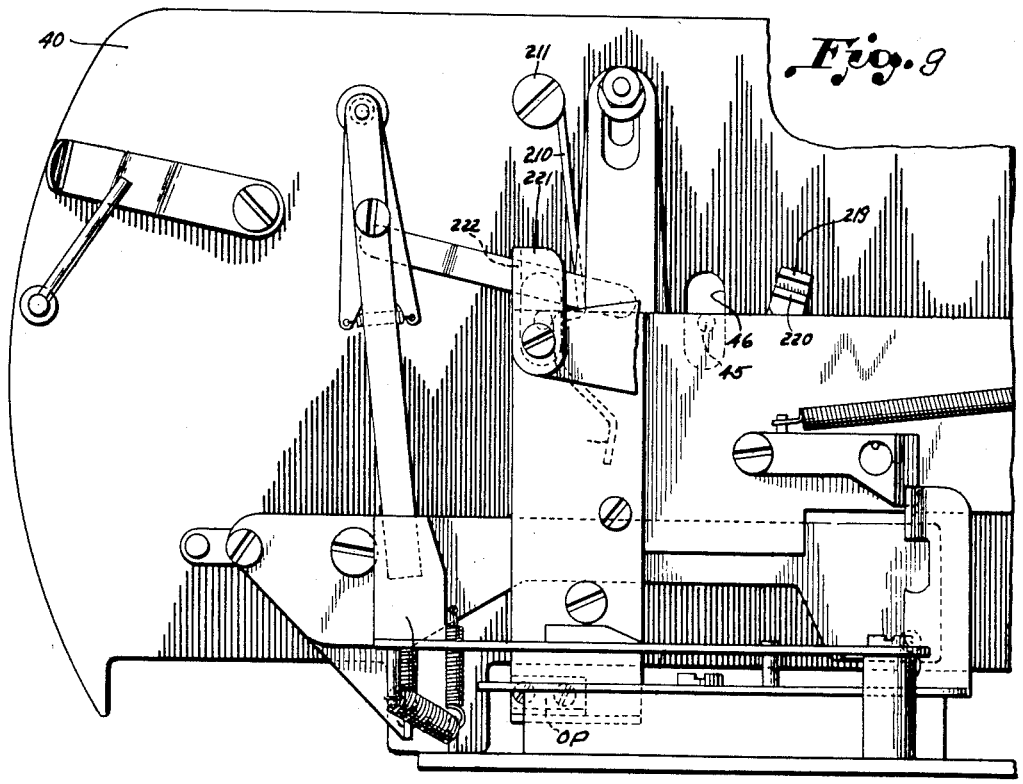

United States Patent Office 2,738,129
Patented Mar. 13, 1956

2,738,129

CALCULATING MECHANISM

Charles A. Parker, Chicago, Ill., assignor, by mesne assignments, to Burroughs Corporation, a corporation of Michigan Original application September 29, 1949, Serial No. 118,691. Divided and this application January 31, 1952, Serial No. 269,200

18 Claims. (Cl. 235—60.31)

This invention relates to totalizing mechanism for use in calculating machines and it relates more particularly to the means for controlling movements of the totalizer in machines of the type described. This application is a division of my copending application Serial No. 118,691, filed on September 29, 1949, and entitled "Calculating Mechanism," now Patent No. 2,701,685.

An object of this invention is to provide calculating mechanism including racks and pinions, in which the pinions are yieldably brought into and out of mesh with the racks by spring means instead of positive drive.

Another object is to provide calculating mechanism in which register pinions are brought yieldably into mesh with racks through the urge of spring means and are automatically releasably latched in mesh during their operation.

A further object is to provide calculating mechanism in which register pinions are automatically latched in mesh with racks and are spring urged out of mesh, whereby unlatching of the pinions automatically effects unmeshing of the pinions under the urge of the spring means.

Other and incidental objects will be apparent from the following description taken in conjunction with the accompanying drawings.

Briefly described, this invention comprises calculating mechanism that is adapted for use in any calculating machine in which a mechanism is actuated from an operating member that moves in a cycle at each actuation, whether the cycle be reciprocating, oscillating, or rotary. The calculating mechanism includes two independent sets of register pinions adapted for operation in unison whereby one set of pinions adds and the other set of pinions simultaneously subtracts the same item in a computing cycle of the machine. Tens transfer mechanism is provided and also reset mechanism for restoring to normal condition all elements of the transfer mechanism which function in effecting transfers during a computing operation. The reset mechanism is adapted for operation independently of the machine's operating member by extraneous motive power provided by springs. This independent operation of the reset mechanism is effected from the actuation of a control element, such as a total key or a subtotal key, which is movable to condition the machine for totaling or subtotaling; and the reset mechanism, when so controlled, operates before the start of the totaling or subtotaling cycle. The mechanism for shifting sets of pinions operates during a computing cycle of the operating member to move the two sets of pinions oppositely into or from mesh with their racks. The shifting mechanism incorporates spring means by which the pinions are adapted to be yieldingly moved either into mesh or out of mesh with their respective racks. The position of an element of the shifting mechanism determines the effective directional bias of the spring means. This element normally is moved to its various positions by driving connection with the operating member, but is adapted for control by actuator means influenced by operation of either the total or subtotal key of the machine.

For purposes of compliance with the statute, and without restriction to the specific form, the following disclosure constitutes a practical embodiment of the invention by which its basic principles are reduced to practice.

In the drawings:

Figure 3 is a fragmentary elevation, with detail added, of the structure shown in Figure 2;

Figure 4 is a sectional view substantially on the line 4—4 of Figure 3;

Figure 5 is an elevation, with parts removed, of detail shown in Figure 3;

Figure 7 is a view similar to Figure 6 with the parts illustrated in position occupied in a normal computing operation during the first half cycle;

Figure 8 is a similar elevation illustrating the position of the parts with the reset mechanism tripped prior to a subtotaling cycle of the operating member; and Figure 9 is an elevation illustrating details of mechanism, also at the left rear end portion of the machine, employed in connection with totaling operations as distinguished from subtotaling.

Figure 1:
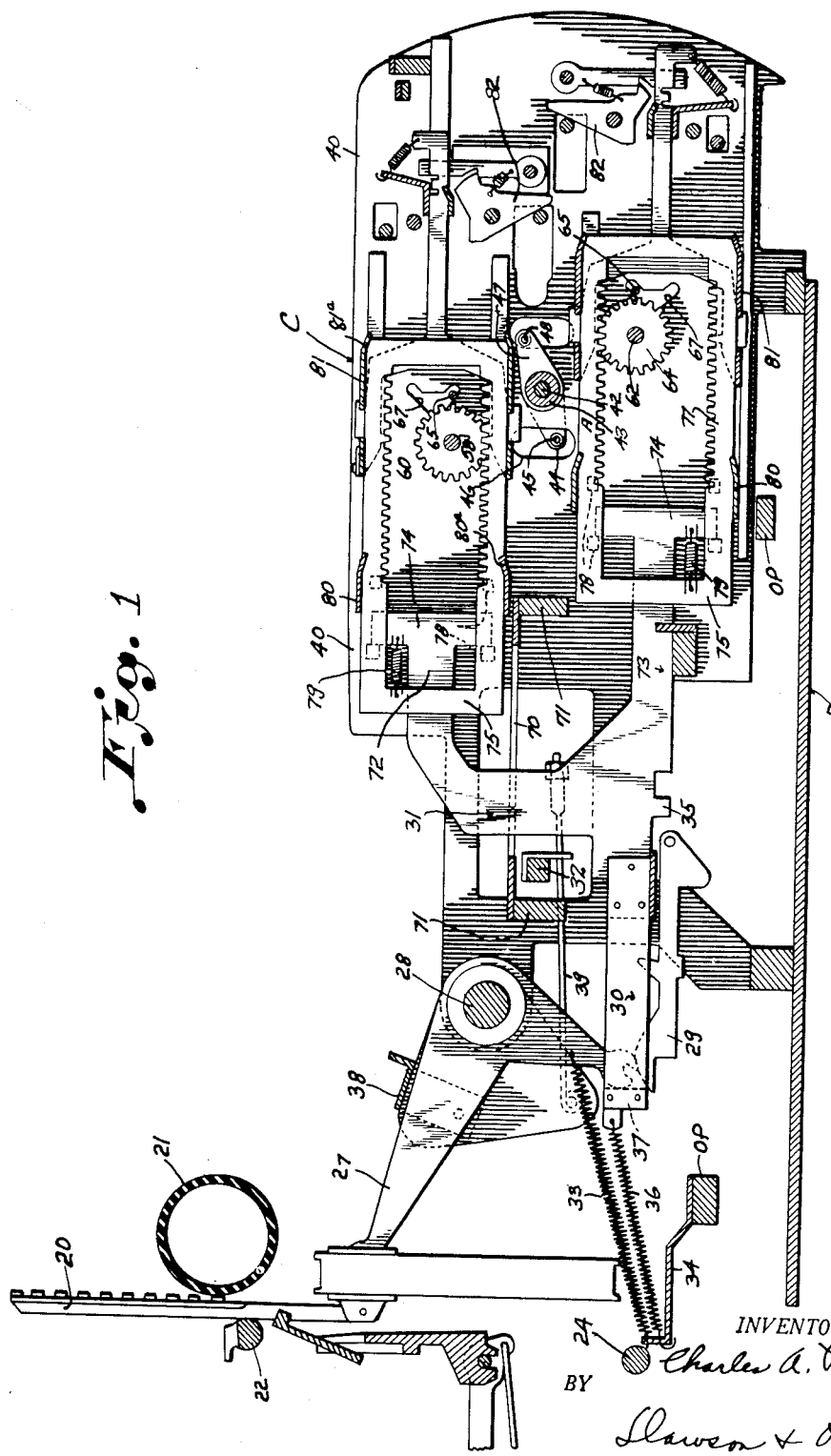
Figure 1 is a vertical section longitudinally through the calculating mechanism of the machine in which the invention is incorporated.

As herein disclosed, the invention is shown incorporated in the accounting machine comprising the subject matter of the copending application of Charles A. Parker and Clifton K. Rainey, Serial No. 99,081, filed June 14, 1949, now Patent No. 2,696,945, and the copending application of Charles A. Parker, Serial No. 109,570, filed August 10, 1949, now Patent No. 2,646,928. Briefly described, the machine includes a plurality of adding type carriers or bars 20 movable vertically into and from printing position relative to a platen 21. The type bars in printing are struck by a hammer 22 triggered by cam means on a main drive shaft 24 rotatable in the machine frame by motor means, not shown, under the control of an operator. An operating member OP reciprocates horizontally in the main frame of the machine through one full cycle at each revolution of the drive shaft, there being an operating connection between the shaft and operating member. Each actuation of the motor means effects one complete rotation of the drive shaft and correspondingly moves the operating member OP through one full cycle between two limit positions in one of which it is at rest. When at rest, the operating member is at its rearmost limit of travel, as in Figure 2.

Each type bar is moved to and from printing position by an individual bell crank lever 27 pivoted at 28 to oscillate in a vertical plane common to the type bar. The long arm of the lever is in operating connection with the lower end of the type bar and, in normal position with the type bar fully lowered out of printing position, the short arm of the lever is held by a latch 29 so that the lever cannot rock to lift the type bar. The latch is biased to engaged position and is releasable by the camming action of an extension 30 on an actuator slide 31 of the calculating unit C. A slide 31 is paired with each type bar and reciprocates horizontally in the vertical plane common to its associated type bar and bell crank lever. A restore bar 32 extends transversely across the leading edge portions of the slides and normally restrains them against forward movement towards the type bars under the urge of a contractile spring 33. One such spring is connected between the short arm of each bell crank lever 27 and a fixed element 34 of the operating member OP.

Each slide 31 has an abutment 35 that is engageable by key set stop pins, not shown, which determine the extent of forward travel of the slides. When the operating member OP is cycled, those slides permitted movement beyond zero position travel forward under the pull of a contractile spring 36; one such spring being connected between the front end of each slide extension 30 and the operating member element 34. The restore bar will have been moved ahead of the slides under propulsion of the operating element by the time those slides free to move beyond zero position begin their travel past that point. In the course of their forward travel their associated latches 29 are disengaged, whereupon the released bell crank levers 27 rock under the pull of their springs 33 to lift their corresponding type bars into printing position. The terminal portion of the short arm of each released bell crank lever engages behind an abutment 37 on the slide extension 30, so that the printing elevation of the type bar is determined by the point at which further forward travel of the slide is arrested.

At the conclusion of a printing operation the operating member OP moves rearwardly through the second half of its cycle back to its initial position of rest. During this movement the restore bar is retracted and carries back with it all advanced slides. The retracting slide extensions rock their associated bell crank levers and pull the type bars down out of printing position. When the slides come to rest at the end of their rearward travel a further rocking movement is given the bell crank levers to carry their short arm terminals rearwardly away from the slide extension abutments 37 for reengagement by the latches 29. This further movement is effected by a pull-down yoke 38 that straddles the long arms of the entire set of bell crank levers in an operating connection 39 with the restore bar.

The instrumentalities and the arrangement of parts thus far described in detail are those of the aforesaid Parker and Rainey application Serial No. 99,081, filed June 14, 1949, and are not a part of this invention except as they enter into the general combination. The present invention deals particularly with the register section of the calculating unit C.

The register

The register section is contained within the calculating unit frame. This frame comprises parallel side walls 40 having appropriate transverse connection and mounted on the bottom plate B of the main frame of the machine to extend longitudinally therein in rear of the platen and the type bar assembly. These walls journal a transverse concentric shaft assembly comprising an inner shaft 42 and an outer sleeve shaft 43 rotatable thereon. Cranks 44 fixedly secured on the inner shaft 42 exteriorly of the walls 40 support between them a transverse rod 45 which plays in a vertical slot 46 in each wall in accordance with the throw of the cranks on rotation of the inner shaft. In like manner the outer shaft 43 has similar cranks 47 fixedly secured thereto interiorly of the walls 40. These cranks are provided at their outer ends with lateral outwardly directed pins 48 which extend through the walls 40 in another pair of the clearance slots 46. The cranks 44 and 47 are oppositely directed and are spaced 180 degrees apart. See Figures 1, 3, 4 and 5.

Shaft 42 extends outwardly beyond the walls 40. One end of the inner shaft 42 journals an annular shouldered sleeve 49 spaced axially from the adjacent crank 44 and which is secured to an inner disc 50 and provides a bearing for portions of two smaller split discs. The sleeve is free to turn on the shaft between the crank 44 and a retaining nut 42' in the end of the shaft. The large disc 50, best shown in Figure 3, is formed with a pair of diametrically opposed arcuate slots 51 through which extend, respectively, the adjacent end of the rod 45 and the adjacent pin 48, in ample clearance. The disc 50 is further provided with a pair of outwardly directed lateral studs 52 in diametric opposition, and with a second pair of similar but shorter studs 53 diametrically opposed and spaced 90 degrees relative to the studs 52, and radially outward of the slots 51.

Each split disc, see Figure 3, comprises two identical right relative to semicircular sections. The one at the right relative to Figure 3 consists of sections 54 and 54a, and that at the left has sections 55 and 55a. The sections of the discs are in coplanar relation and are provided at their opposed edges with rounded bearing recesses adapted to seat over the shouldered sleeve 49 and over the disc studs 53, the rod 45, and pin 48. The sections are further formed with an aperture suitable to house a contractile spring 56 secured to the sections in a manner biasing their opposed edges into meeting engagement. The opposed edges are angled in diverging relation between the peripheral edge of each section and its large recess, so that when the split discs are assembled their sections are capable of a relative rocking movement. As shown in Figure 3, the split discs are disposed in overlapped relation and eccentric with respect to the assembly of the shafts 42 and 43. Their springs 56 urge the opposed edges of the sections in clamping engagement over the sleeve 49, end of rod 45, pin 48, and studs 53.

The rod 45 extends through and pivotally supports the lower ends of a pair of inverted L-shaped links 57 that are vertically slidable on the outer faces of the walls 40. These links support between their upper ends a transverse register pinion shaft 58 which plays in and through a vertical guide slot 59 in each wall. A set of register pinions 60, one for each numerical order, is freely rotatable on the shaft 58 between the plates 40. In like manner, the pins 48 of the sleeve shaft cranks 47 extend through and pivotally support the upper ends of a pair of depending L-shaped links 61 that are vertically slidable on the outer faces of the walls 40. The depending links support between their lower ends a transverse register shaft 62 which plays in and through a vertical guide slot 63 in each wall. A second and similar set of register pinions 64 is freely rotatable on the shaft 62, each being in vertical coplanar alignment with its corresponding pinion in the upper set. When the register pinions are in neutral position they are latched against rotation by means of a bar 65 meshed with the pinion teeth under the pull of contractile spring 66. The latch bar for each set of pinions extends between the walls 40 and projects at each end through a triangular aperture 67 in the wall, with the end of the bar slidably supported in a horizontal slot 68 in the foot of the adjacent link 57 or 61. Reciprocation of the links correspondingly moves the latch bars, which then are cammed by the sloping sides of the apertures 67 and shifted laterally against the pull of the spring 66 to disengage the register pinions.

A driving connection, later described, between the disc 50 and a rocker actuated by the operating member OP effects an oscillation of the shaft assembly 42—43 to shift the register pinions into operative engagement with racks of the calculating actuator slides just before the slides start to move back from their forward limit positions following a printing operation, whereby the amount of the item is added or subtracted in the register in accordance with the setting of the machine controls for effecting the direction of oscillation.

The register actuating slides 31 are arranged in parallel relation for horizontal reciprocation in a guide comb 70 mounted on transverse supports 71 in the calculating unit frame. Each slide is rearwardly bifurcated to provide an upper register stem 72 and a longer lower register stem 73 in parallel coplanar vertical alignment. Each stem terminates in a T-head 74 disposed at one side of a rectangular box rack 75 having a top rack bar 76 and a bottom rack bar 77 toothed to mesh with the adjacent register pinion that is disposed between the two. The stem head plays between a pair of longitudinally spaced lugs 78 on the front end portion of both rack bars. These lugs are directed laterally from that side of the rack which faces the rack of the next higher denominational order. A contractile spring 79 connected between a flange of the T-head and the front end of the rack normally biases the rack to the position shown in Figure 1, with the front lugs 78 abutting the flanges of the T-head. It has proved practical to employ a single spring, with the springs of alternate racks staggered, but if desired a pair may be used for each rack. The racks are supported and guided by comb plates 80 extending transversely between the frame sides 40 at the front end of the racks, and by comb plates 81 of greater width similarly mounted rearwardly of the plates 80 and spaced therefrom. The comb plates are provided with rearwardly directed vertically convergent fingers 80a and 81a, respectively, which engage the sides of the racks to maintain them in properly spaced and vertical position. When the racks are fully retracted, their vertical rear ends abut individual rack rests 82, in which position the springs 79 are under tension urging the racks to further rearward movement.

*Register shift*

Figure 2:
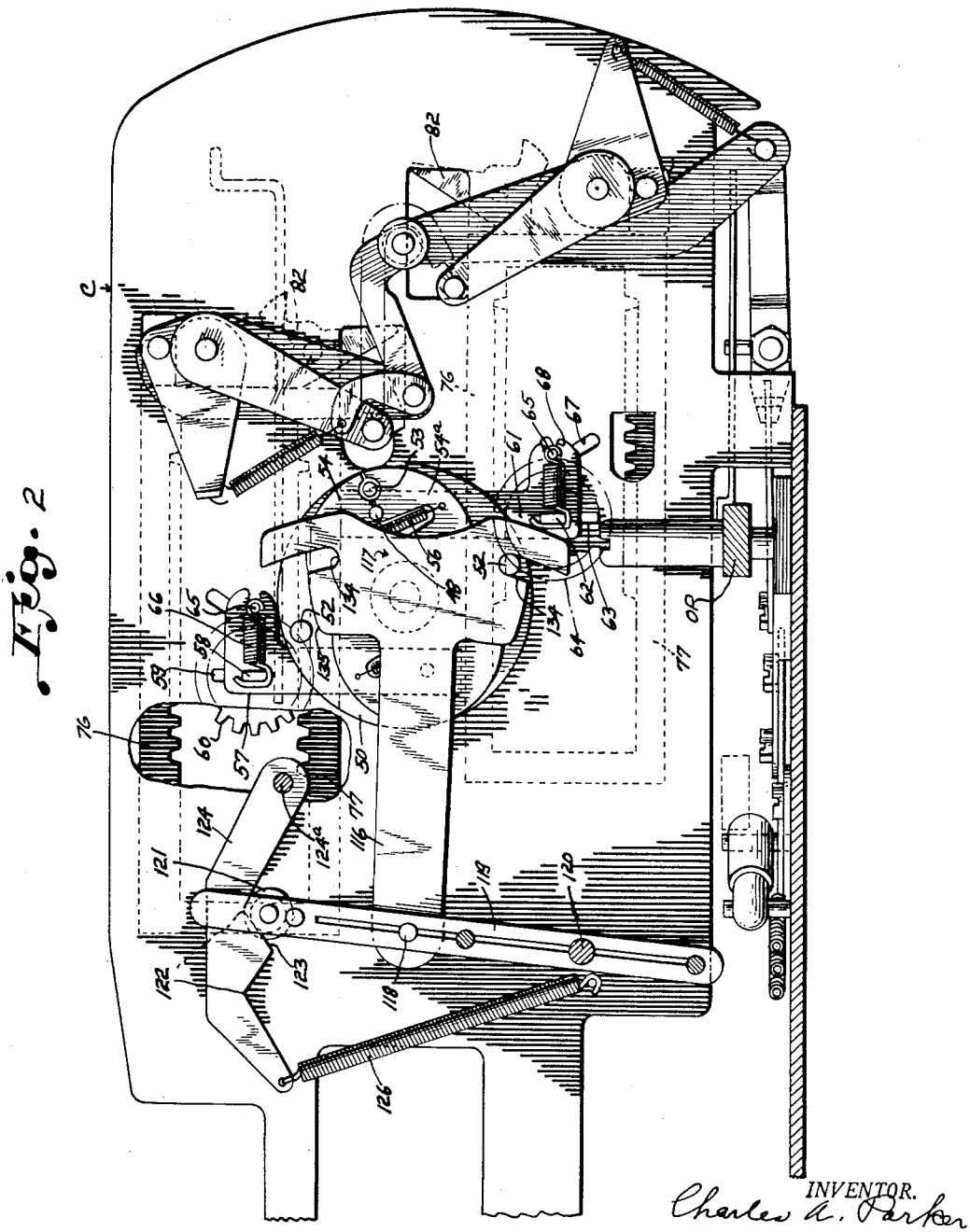
Figure 2 is an elevation illustrating details of the register shifting mechanism and the reset mechanism.

In this embodiment of the invention the addition side of the racks is in the top bars and the subtraction side of the racks is in the bottom bars of the upper and lower racks; so that when the register pinions are shifted into rack engagement, as in Figures 1 and 2, the lower register is employed for addition and the upper register for subtraction. When the slides 31 move forward for indexing and printing, both the upper and the lower sets of register pinions are in neutral disengaged position. At the initiation of rearward movement of the operating member OP in the second half of its cycle, a connection from the operating member operates to rock the cranks 47, shaft 43, and the pins 48 to lift the links 61 and thereby carry the set of lower register pinions 64 into mesh with the top bars of their racks. At the same time, the links 57 are lowered to carry the set of upper register pinions 60 down into mesh with the bottom bars of their racks. The driving connection from the operating member OP includes a horizontally disposed lever 116 having a rearwardly directed arcuate T-head 117 located alongside and outwardly of the assembly of split discs and the larger disc 50. This lever 116 is of thin planar structure and is pivoted at its forward end to oscillate in a vertical plane on a fulcrum member 118 carried on a vertical rocker post 119. The rocker post is pivoted between its ends on a fulcrum 120 carried by a support element secured on the base of the machine. At its upper end the post mounts a roller 121 that is engageable in valleys 122 at the sides of a ridge 123 upon the bottom edge of a detent lever 124 which is pivoted at one end as at 124a to the support element secured to the base of the machine. The detent is biased downwardly in engagement with the roller 121 by a contractile spring 126 connected between the free end of the detent and a point of attachment on the support, whereby the post is held yieldingly in either of two positions determined by the valleys 122.

In the position of the parts as shown in Figures 3 and 5 the register pinions are in neutral disengaged position. When the operating member OP moves rearwardly, its connection, not shown, of any suitable type, with the rocker post 119 rocks the post rearwardly, as shown in Figure 2, and correspondingly shifts the lever 116. The head 117 seats on the lower of the pair of studs 52 on the large disc 50, with the stud housed at the inner end of an arcuate keeper slot 134 in the lower arm of the head 117. The upper stud 52 is adapted to play in a similar slot 134 in the upper arm of the head when the lever 116 is rocked upwardly. In the normal position of the lever, the upper disc stud is free of its keeper slot and is in position to ride over a lateral reduction 135 of the head when the disc is rotated counterclockwise, as shown in Figure 2. Rearward shift of the lever 116 drives the lower stud 52, rocking the disc 50 in a counterclockwise direction, as shown in Figure 2. This rocking movement correspondingly elevates the rear stud 53 of the disc 50 and simultaneously correspondingly lowers the forward stud 53 of the disc. As the rear stud 53 moves up it lifts the split disc section 54 and this section in turn, acting through its spring 56, pulls up the lower section 54a and correspondingly elevates the pins 48 so that the links 61 are lifted to shift the lower register pinions into engagement with the top bars of their racks. In like manner, but in reverse movement, the forward stud 53 in moving down depresses the split disc section 55a and this in turn, acting through its spring 56, pulls down the upper section 55 and correspondingly depresses the rod 45 to lower the links 57 whereby the upper register pinions 60 are carried down into mesh with the bottom bars of their racks. When the operating member OP is again cycled, its forward movement is transmitted through the driving connection to rock the post 119 forwardly and correspondingly to shift the lever 116 forwardly. In so moving, the lever, acting through the head 117, drives the lower stud 52 in a clockwise direction. This movement of the stud correspondingly rocks the disc 50 so that its rearward stud 53 is carried down to depress the lower split disc section 54a. This section, acting through its spring 56, correspondingly pulls down the upper section 54 which, in turn, carries down the pin 48 and thereby lowers the links 61 to move the lower register pinions out of engagement with their racks and back to neutral position. In like manner, but in reverse movement, clockwise rotation of the disc 50 elevates its forward stud 53 to raise the split disc section 55 and exert a pull on the spring 56. This pull elevates the lower disc section 55a and correspondingly elevates the rod 45 to lift the links 57 and carry the set of upper register pinions out of engagement with the lower bars of their racks and into neutral position. In the operation as just described, the pinions would have been shifted during the cycle of operation so that a computed amount would be added in the lower register and simultaneously subtracted in the upper register. This is the operation for a mathematically added amount.

In taking a subtotal of an amount it is necessary to employ one register for an interval of operation while action of the other is temporarily suspended. In such case, means, later described, is employed to hold a set of pinions in one register from shifting while the other is shifting. This action is made possible by the flexibility of the coupling comprising the assembly of the large disc 50 and the smaller split discs. An important concept to be grasped at this time is the extremely wide range of possible combinations of register shifting permitted by the high flexibility of the coupling comprising the disc assembly. This is due to the springs 56 in conjunction with the split discs and provides a coupling having any desired yielding characteristic whereby various combinations of register shifting can be effected. The flexibility of the disc assembly would permit both sets of register pinions to be engaged simultaneously in both lower bars of the racks or in both upper bars of the racks.

When the slides 31 move forward under the pull of their spring connectors 36 moving with the operating member OP in the first half of its cycle, their T-heads 74 engage the forward rack lugs 78 and the racks are correspondingly advanced to the point at which they are stopped by any control instrumentality which determines the extent of their advance and, consequently, the printing position of their paired type bars. At the conclusion of a printing operation the operating member starts back through the second half of its cycle. Before the racks begin their back stroke the connection 116 given movement by the operating member effects a shift of those register pinions which are free to shift and the pinions are meshed with their respective racks or disengaged therefrom or remain meshed.

When either a total or a subtotal is taken, the register pinions are brought forcibly into zero position against the holding action of fixed stop means which determines the zero point. Movement of the racks in returning the pinions to the zero stop position exerts a force which tends to cam the registers out of mesh with the racks at the instant the pinions are arrested at zero position. In order to eliminate possibility of unauthorized camming of the register pinions out of mesh at this stage, this invention incorporates means for locking the pinions in mesh until the effective force of the impact of the pinions reaching zero stop position has been removed. This means, in the case of the pin 48 of the shifting mechanism for the lower register, comprises a depending finger 210 pivoted at its upper end on a stud 211 carried by the adjacent side wall 40. The finger 210 is urged rearwardly by a contractile biasing spring 212 connected between a point of attachment on the finger and a point of attachment on the adjacent wall 40. The shank of the finger is reverted to provide a shoulder 213 that is adapted to engage beneath the pin 48 when it has been moved upwardly by shift of the lower register pinions to the add side of their racks during movement of the operating member. Normally, prior to movement of the operating member, the ear 191 on the extension 192 of the bell crank lever 184 engages and cams forwardly the bottom end portion 214 of the latching finger 210 so that the shoulder 213 is disposed out of the path of movement of the pin 48. When the operating frame starts forward it clears the cam 188 and the bell crank lever 184 rocks to move the ear 191 rearwardly, as shown in Figure 7, so that the finger 210 is permitted rearward movement under the urge of the spring 212, whereupon it moves into position beneath the pin 48 when the pin is moved upwardly. When the latching shoulder 213 is engaged beneath the pin 48 it holds the register pinions in mesh with their racks and prevents the disengagement, previously described, due to the impact of the pinions against their stop members when they arrive at zero position. The latching means for the rod 45 of the shifting mechanism for the pinions of the upper register comprises a shoulder 215 on the rear edge of a second bell crank lever 216 that is fulcrumed alongside the lever 184 on the same fulcrum stud 185. The lever 216 is disposed between the lever 184 and the adjacent wall 40. The lower arm of the lever 216 is substantially identical with the lower arm of the lever 184 and it is similarly provided with a cam portion 217 which normally seats on top of the operating member when that member is at its rearmost limit position. When the operating member moves forward it clears the cam 217 and the lever 216 rocks under the bias of a spring 218 to move the shoulder 215 beneath the rod 45 when the rod moves upwardly to mesh the upper register pinions with the add side of their racks. The shoulder 215 functions similarly to the shoulder 213 in that it latches the pinions of the upper register against camming out of engagement by the force of the impact resulting from return of the pinions to their zero stop positions or from any other force tending to shift the pinions against their latch held position, until the latch has been released. Thus it may be seen that when one of the latches is engaged to hold the pinions against shifting movement, rocker 119 could be shifted forward and through part 116 and studs 52 urge the pinions to shift under the tension of spring 56 but no shift would take place until the time the latch shoulder would be removed from its holding relation.

Since in a subtotal operation the pinions of the register in which the total is taken remain in mesh with their racks throughout the total taking cycle, the latching shoulders 213 and 215 are permitted to remain in latched position throughout the major portion of the cycle. However, since in total taking it is necessary that the pinions be taken out of mesh after the total is taken, means acting from the operating member coacts with lateral extensions 219 and 220 on the respective levers 216 and 184 to rock the levers forwardly, whereby the shoulders 213 and 215 are moved out of latching position.

The upper left hand rear end of the frame of the operating member OP has secured thereto a rigid upright 221 provided with a laterally directed flange 222 which extends in the direction of the adjacent wall 40, see Figure 9. When the operating member arrives near the end of its forward movement in the first half cycle, the flange 222 engages the lateral extensions 219 and 220 to rock the bell crank levers 216 and 184 forwardly so that the latching shoulders 213 and 215 are moved out of their latching position. When these shoulders are cleared, the register pinions are conditioned for shifting by the regular shifting mechanism of the machine. When the operating member OP begins its rearward movement in the second half of the cycle, the flange 222 moves away from its holding engagement with the extensions 219 and 220 so that the levers are free to rock under the pull of their biasing springs for reengagement of whichever latching shoulder is free to move rearwardly by virtue of the elevated position of either the rod 45 or pin 48. When the operating member arrives at the rear end portion of its travel in the second half cycle, it engages the cams 188 and 217 to rock the bell crank levers 184 and 216 forwardly whereby to remove the shoulders 213 and 215 from holding position. The above described engagement of the latching shoulders occurs in the normal computing cycle operations in the machine as well as during subtotaling and totaling.

Figure 6:
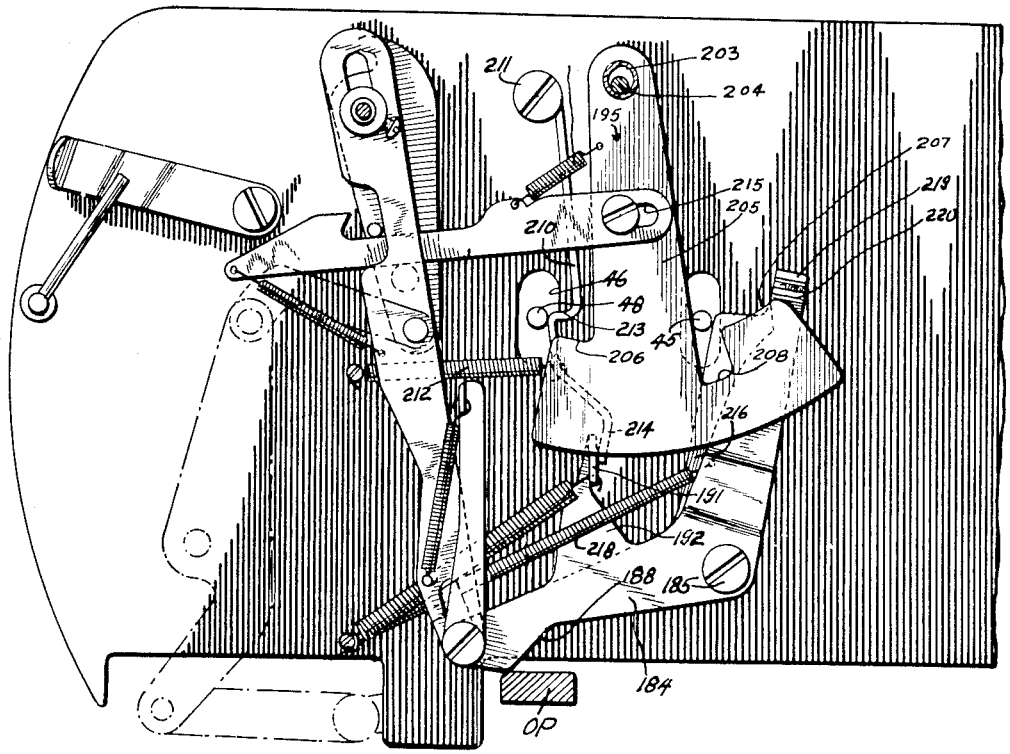
Figure 6 is an elevation at the left rear end of the machine, illustrating details of the register shift control means actuated for subtotaling operation with the parts positioned prior to a computing operation of the machine.

Outwardly of the left hand side plate 40 of the calculating unit frame, there is disposed a latching blocking plate 195, shown in Figures 6, 7 and 8. The blocking plate is pivoted at its upper end on a bearing 203 mounted eccentrically on a supporting stud 204 that is secured to the adjacent side wall. The plate is thus pivotally suspended for oscillation in a vertical plane. The lower end of the blocking plate has a substantially T-shaped head 205 which provides at the rear edge of the plate a shoulder 206 that is adapted to be engaged beneath the pin 48 of the lower register shifting means, previously described, when the blocking plate is swung rearwardly to the position shown in Figure 8. The pin 48 is thus blocked against downward movement, so that the pinions of the lower register are incapable of movement to the subtract side of their racks although they are free to move upwardly for mesh with the add side of their racks. The forward arm of the T-head 205 provides a shoulder 207 that is adapted to engage beneath the rod 45 of the upper register pinion shifting mechanism to hold the rod against downward movement when the blocking plate is shifted rearwardly, so that the upper set of register pinions are prevented from moving down into mesh with the subtract side of their racks although they are free to move upwardly into mesh with the add side. In the normal position of the blocking plate 195, as in Figure 7, the shoulders 206 and 207 are clear of the pin 48 and the rod 45. The rear edge of the head 205 is disposed forwardly of the pin 48 when the blocking plate is in cleared position so that the pin 48 is free to move downwardly. In order to accommodate downward movement of the rod 45 in the cleared position of the blocking plate, the head 205 is provided with a clearance slot 208 which permits free downward movement of the rod.

This blocking plate is adapted for movement by means controlled by the sub-total and total-taking mechanism and acts as a latch to prevent shifting of the pinions into mesh with their racks when the pinions are so urged by the flexible coupling assembly of the large disc 50.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention as claimed.

I claim:

1. In combination, a calculator rack, a register pinion having stops thereon to limit the movement of the racks when in meshing relation therewith, means for shifting the pinion into and from mesh therewith, said means including a spring for moving the pinion yieldably into mesh, and means operative automatically to latch the pinion in mesh after its movement by said spring and to maintain the meshed relation to prevent disengagement due to engagement between the racks and the stops of the pinion.

2. In combination, a calculator rack, a register pinion, means movable in one direction for shifting the pinion into mesh therewith and in another direction for shifting out of mesh, said means including a spring urging the pinion to move in the direction in which the means moves, a latch operative automatically to retain the pinion in mesh against the urge of said spring during unmeshing movement of the shifting means, and means operative automatically to release the latch after an interval following unmeshing movement of the shifting means.

3. In a calculating machine, the combination of a pair of actuators having a spaced pair of racks formed therein, a pinion mounted for shifting movement relative each actuator into and out of meshing relation with said racks, an operating member shiftable in opposite directions from normal, a pair of members for each pinion resiliently joined for movement in the same direction together, means on said operating member extending between said pair of members for controlling displacement of one of said members therewith responsive to movement of the operating member from and to normal position, and means operatively connected to a pinion and extending between said pair of members whereby said pinion is resiliently urged to shift into and out of meshing relation with its corresponding rack responsive to the resilient connection between said members upon shifting movement under control of said operating member.

4. A calculating machine as claimed in claim 3 in which the pair of members resiliently joined for movement in the same direction together comprises separable plates having adjacent edges substantially in abutting relation.

5. A calculating machine as claimed in claim 3 in which the pair of members resiliently joined for movement in the same direction together comprises a pair of plates having adjacent edges substantially in abutting relation and a spring member anchored at one end upon one plate and at the other end upon the other plate member.

6. A calculating machine as claimed in claim 3 in which the means on said operating member extending between the pair of members comprises a post fixed to the operating member and extending within a groove portion formed in adjacent edge portions of said pair of members.

7. A calculating machine as claimed in claim 3 in which the means operatively connected to the pinion comprises a post extending within a groove formed in adjacent edge portions of said pair of members, and a member connecting the post with the pinion for conjoint movement.

8. A calculating machine as claimed in claim 3 which includes blocking means shiftable between normal position and a position to engage the means operatively connected to the pinion when said means has been moved in one direction to effect meshing relation between said pinion and rack to prevent return movement thereof to unmeshing relation, and means constantly urging said blocking means towards blocking position.

9. A calculating machine as claimed in claim 3 which includes blocking means shiftable between normal position and a position to engage the means operatively connected to said pinion when said means has been moved in one direction to effect meshing relation between the pinion and rack thereby to prevent return movement of the pinion from meshing relation, means normally holding said blocking means out of blocking position but which releases said blocking means during a cycle of operations of the machine to permit movement to blocking position in the event that said pinion connecting means has been shifted in the direction for effecting meshing relation, and means constantly urging said blocking means towards blocking position.

10. A calculating machine as claimed in claim 9 which includes additional means operative during an intermediate portion of a cycle of operations of the machine to displace the blocking means from blocking position thereby to permit shifting movement of the pinions to unmeshing relation.

11. In combination, a calculator rack, a register pinion, cyclically operated means for shifting the pinion into and from meshing relation with the rack during a cycle of operation, said means including a spring for moving the pinion yieldably, means to operate said rack to rotate the pinion while meshed therewith, a stop cooperable with the pinion to arrest rotation of the latter means operative automatically to latch the pinion against unmeshing movement against the yielding force of said spring until after the stop is engaged to prevent such movement upon engagement, and means to operate said latch means for releasing said pinion for movement from meshing relation with the racks subsequent to engagement of said pinion with the stop.

12. Calculating mechanism including a set of movable racks, a set of pinions movable into mesh with said racks for rotation thereby, a device including yielding means to yieldably move said pinions into mesh with said racks, stop means to arrest said pinions upon rotation thereof by said racks to predetermined positions, and latch means operable automatically upon movement of said pinions into mesh with said racks to latch said pinions against movement out of mesh with said racks by arrest of said pinions by said stop means.

13. Calculating mechanism comprising first and second plural order series of rack devices, a plural order series of differential actuators each connected with the rack devices of corresponding order of both of said series, first and second plural order series of register pinions, individual supporting means for each of said series of pinions movable from a first position where the pinions of the thereby supported series are unmeshed from the rack devices to either a second position where said pinions are meshed with the rack devices of like order of the corresponding series in positive algebraic relation or a third position where said pinions are meshed with said rack devices in negative algebraic relation, an engaging and disengaging operator, individual connecting means connecting each of said pinion supporting means with said operator for movement by the latter, and means to move said operator from a neutral position where the pinions are unmeshed from said rack devices in a first direction to move said supporting means to mesh the pinions of each series in a predetermined algebraic relation with its rack devices and in a second direction to mesh the pinions of each series in reversed algebraic relation with its rack devices, each of said connecting means including a first element movable with said operator, a second element connected with the supporting means for the respective series of pinions, a pair of members embracing said elements between them, and a spring connected to both of said members to urge each member toward the other and thereby yieldingly urge said second element to move with said first element in both directions of movement of said operator but permitting movement of either member from the other by movement of either of said elements while the other is stationary.

14. Calculating mechanism comprising first and second plural order series of rack devices, a plural order series of differential actuators each connected with the rack devices of corresponding order of both of said series, first and second plural order series of register pinions, individual supporting means for each of said series of pinions movable from a first position where the pinions of the thereby supported series is unmeshed from the rack devices to either a second position where said pinions are meshed with the rack devices of like order of the corresponding series in positive algebraic relation or a third position where said pinions are meshed with said rack devices in negative algebraic relation, an engaging and disengaging operator, individual connecting means including yielding means connecting each of said pinion supporting means with said operator for movement by the latter, means to move said operator from a neutral position where the pinions are unmeshed from said rack devices in a first direction to move said supporting means to mesh the pinions of each series in a predetermined algebraic relation with its rack devices and in a second direction to mesh the pinions of each series in reversed algebraic relation with its rack devices, and means settable to block movement of the supporting means of a series of pinions to mesh said pinions with their rack devices in a predetermined algebraic relation.

15. Calculating mechanism comprising first and second plural order series of rack devices, a plural order series of differential actuators each connected with the rack devices of corresponding order of both of said series, first and second plural order series of register pinions, individual supporting means for each of said series of pinions movable from a first position where the pinions of the thereby supported series is unmeshed from the rack devices to either a second position where said pinions are meshed with the rack devices of like order of the corresponding series in positive algebraic relation or a third position where said pinions are meshed with said rack devices in negative algebraic relation, an engaging and disengaging operator, individual connecting means connecting each of said pinion supporting means with said operator for movement by the latter, said engaging and disengaging means being movable from a neutral position where the pinions of both series are unmeshed from their rack devices in a first direction to mesh said first series of pinions in positive algebraic relation with the first series of rack devices and said second series of pinions in negative algebraic relation with said second series of rack devices and in a second direction to mesh each series of pinions in reversed algebraic relation with its rack devices, and means adjustable from an ineffective position to an effective position to block movement of either supporting means to mesh either series of pinions with their rack devices in a predetermined one of said algebraic relations, each of said connecting means including means yielding as said operator is moved from said neutral position in the direction to move the respective supporting means to mesh the supported pinions in said predetermined algebraic relation.

16. Calculating mechanism including a set of movable racks, a set of pinions movable into mesh with said racks for rotation thereby, a device including yielding means to yieldably move said pinions into mesh with said racks, stop means to arrest said pinions upon rotation thereof by said racks to predetermined positions, latch means operable automatically upon movement of said pinions into mesh with said racks to latch said pinions against movement out of mesh with said racks by arrest of said pinions by said stop means, and means operable automatically subsequently to the arrest of all of said pinions by said stop means to release said latch means.

17. Calculating mechanism comprising first and second plural order series of rack devices, a plural order series of differential actuators each connected with the rack devices of corresponding order of both of said series, first and second plural order series of register pinions, individual supporting means for each of said series of pinions movable from a first position where the pinions of the thereby supported series is unmeshed from the rack devices to either a second position where said pinions are meshed with the rack devices of like order of the corresponding series in positive algebraic relation or a third position where said pinions are meshed with said rack devices in negative algebraic relation, an engaging and disengaging operator, individual connecting means connecting each of said pinion supporting means with said operator for movement by the latter, said engaging and disengaging means being movable from a neutral position where the pinions of both series are unmeshed from their rack devices in a first direction to mesh said first series of pinions in one algebraic relation with the first series of rack devices and said second series of pinions in the opposite algebraic relation with said second series of rack devices and in a second direction to mesh both series of pinions in reversed algebraic relation with their rack devices, each of said connecting means including means yieldable to permit movement of the respective series of pinions into mesh with their rack devices in one of said algebraic relations while said operator meshes the other series of pinions with their racks in the same algebraic relation.

18. Calculating mechanism comprising amount type carriers movable to and from printing position, an individual differential actuator for each type carrier, a cyclic operating means for moving said actuators, first and second racks connected with each actuator, first and second pinions each shiftable from a neutral position where it is unmeshed from its respective rack in one direction to mesh it with said rack for cooperation therewith in one algebraic relation and in another direction to mesh it with said rack for cooperaton therewith in the opposite algebraic relation, a member movable by said cyclic operating means from a neutral position in either of two directions to shift both of said pinions simultaneously from their neutral positions in either direction to mesh them with their respective racks, and first and second connecting means connecting the respective pinions with said member for meshing and unmeshing movement thereby and each including elements yieldable to permit the respective pinion to remain in neutral position while said member is moved to mesh the other pinion with its rack or to be moved into mesh with its rack in the direction other than that in which said member tends to move it.

References Cited in the file of this patent

UNITED STATES PATENTS

| 1,270,243 | Stickney | June 18, 1918 |
| 2,048,453 | Kall | July 21, 1936 |
| 2,052,905 | Sturm | Sept. 1, 1936 |
| 2,209,240 | Sundstrand | July 23, 1940 |

FOREIGN PATENTS

| 885,822 | France | May 13, 1942 |